Oct. 1, 1957

D. E. BROWN 2,808,576

VALVE MOUNTING STRUCTURE

Filed Aug. 4, 1953

INVENTOR.
DONALD E. BROWN

BY *Theodore C. Jay Jr*

AGENT

United States Patent Office 2,808,576
Patented Oct. 1, 1957

2,808,576
VALVE MOUNTING STRUCTURE

Donald E. Brown, Silver Spring, Md., assignor to Vitro Corporation of America, Verona, N. J.

Application August 4, 1953, Serial No. 372,375

3 Claims. (Cl. 339—112)

My invention relates to electric valve mounting structures and more particularly relates to improvements in such structures.

In many electronic applications it is necessary to distribute a large amount of electronic apparatus within a small enclosed space. Certain components included in this apparatus, such as electric valves, large power resistors, and the like, operate at high temperatures and act as small but intense heat sources. When such components are mounted within an enclosed space, their emitted heat must be dissipated within the space. Other circuit elements mounted adjacent to such sources are subjected to severe thermal stresses created by this heat and often deteriorate rapidly and fail.

It has long been recognized that the chassis on which these components are mounted can be used as a relatively large heat sink. Consequently, devices have been developed for transferring heat from the small heat sources to the chassis in order to lower the temperature of these sources to acceptable values while only slightly raising the temperatures of the chassis itself.

However, known devices of this kind are not suitable for certain types of heat emitting electronic components. Specifically, known devices do not transfer sufficiently heat from an electric valve operating at high temperatures to acceptable values.

I have invented a valve mounting structure which in contradistinction to known devices, provides excellent heat dissipation and which, moreover, provides a secure and rigid mounting requiring much less vertical mounting space than that heretofore used.

It is a primary object of the present invention to provide a new and improved valve mounting structure of the character indicated.

It is another object to provide a valve mounting structure in which the valve is mounted in a direction parallel to a supporting chassis surface.

It is a further object to provide a valve mounting structure which establishes a heat conducting path of relatively large capacity between the heat emitting surface of the valve and the heat absorbing surface of the chassis.

Another object is to provide a valve mounting structure which supports and cools the valve even without the use of a valve socket.

Yet another object is to provide a valve mounting structure which rigidly clamps the valve to a supporting chassis and substantially prevents relative motion between the valve and chassis.

These and other objects of the invention will be explained or become apparent to one skilled in the art when this specification is read in conjunction with the drawings wherein.

Figure 1:
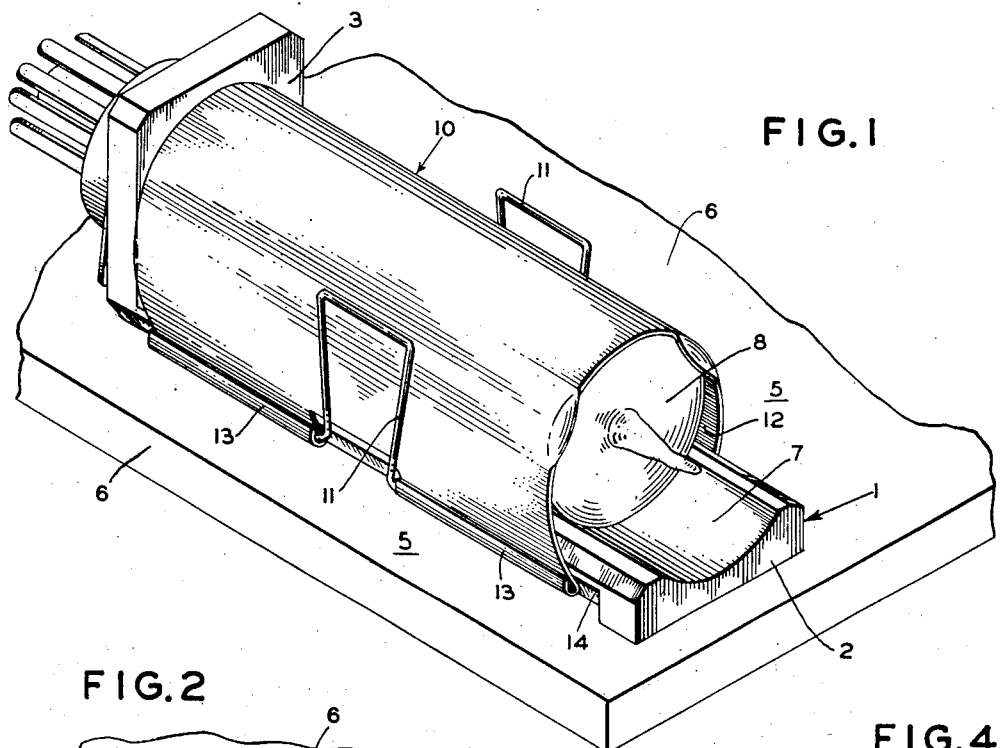
Figure 1 is an isometric view of the valve mounting structure.
Figure 2:
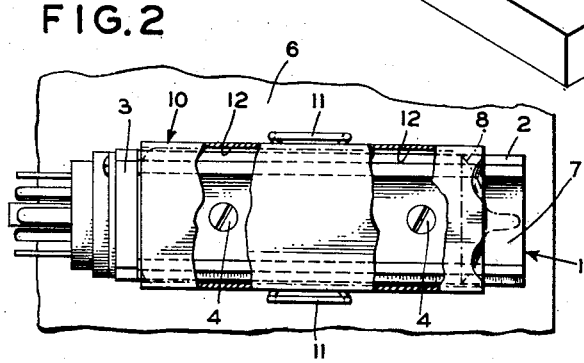
Figure 2 is a top view of this structure with various portions cut away for the purpose of clarity.
Figure 4:
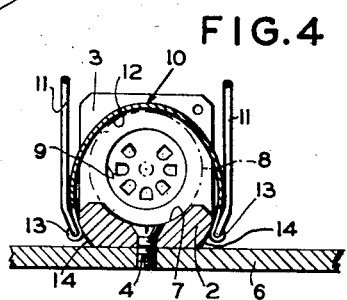
Figure 4 is a transverse section of this structure taken on the view line 4—4 of Figure 3 looking in the direction of the arrows.
Figure 3:
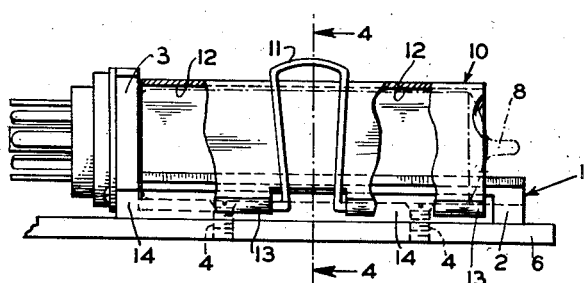
Figure 3 is a side view of this structure with various portions cut away.
Figure 5:
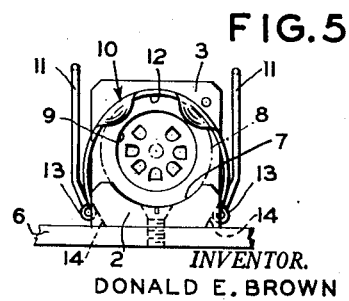
Figure 5 is an end view of this structure.

Briefly stated, my invention contemplates a valve mounting structure for mounting a valve on a supporting chassis in such a manner that the axis of the valve envelope is parallel to the surface of the chassis.

The structure comprises two thermally conductive elements. The first element in preferred form is an L-shaped bracket. One leg of this first element is secured to the chassis surface. The upper surface of this one leg is contoured to the curvature of the valve envelope. The other leg of the first element extends perpendicularly upwards from the chassis surface and is provided with an aperture adapted to receive the valve base. If desired, a valve socket may be mounted in this aperture.

The second element in preferred form is a spring retainer clamp cover which is engageable with the first element and whose inner surface is contoured to the curvature of the valve envelope. These two elements when engaged form a hollow cylinder which supports and surrounds the valve envelope. The valve base extends through the aperture of the first leg and is supported thereby. In this manner the heat radiated from the valve envelope strikes the inner surface of the hollow cylinder and is converted to sensible heat which is then conducted from the hollow cylinder to the chassis. In order to obtain a more efficient conversion of radiant to sensible heat, the surfaces of the two elements which form the inner surface of the hollow cylinder may be colored black.

Referring now to the drawing, a first element which is composed of a material having high coefficient of thermal conductivity, for example, aluminum, is identified generally at 1 and may include legs 2 and 3 which are mutually perpendicular. Leg 2 is mechanically secured, for example, by screws 4 to the surface 5 of a supporting chassis 6. The upper surface 7 of leg 2 is contoured to the curvature of the envelope of valve 8. Leg 3 extends perpendicularly upwards from chassis 6 and is provided with an aperture 9 adapted to receive the base of valve 8.

A second element manufactured of thermally conductive material is identified generally at 10 and may comprise a spring retainer clamp cover provided with clamp handles 11. The inner surface 12 of clamp 10 is also contoured to the curvature of valve 8. When the handles 11 are pressed together the clamp surface 12 is temporarily deformed so that the edges 13 of clamp 10 are engageable with the angled edges 14 of element 1. When the two elements are engaged and the clamp handles are released, the two elements form a hollow cylinder.

Operation is as follows. The first element is secured to the chassis surface. The valve is then placed within the first element so that a longitudinal section of the valve envelope meshes with the upper surface 7 of leg 1 and the base of the valve 8 extends through aperture 9. The second element is then engaged with the first element to form a hollow cylinder which tightly surrounds and supports the valve. When the valve attains a high operating temperature, heat is radiated from the valve envelope and strikes the inner surface of the hollow cylinder and is converted to sensible heat. Some heat is also conducted directly from the valve envelope by the clamp 10 due to the physical contact between these elements. This heat is then conducted through clamp 10 and legs 2 and 3 to the chassis surface 5.

In order to obtain greater efficiency in the latent heat-sensible heat conversion, the surfaces of the two elements, which together form the inner surface of the hollow cylinder, may be colored black.

If desired, a valve socket may be secured within the aperture 9 of leg 3. The clamp 10 may be provided with two projections on the end remote from leg 2 in order to prevent valve 8 from being movable within the cylinder.

In addition to the heat conducting properties of the structure, maximum rigidity is achieved by mounting the valve along its longest dimension and clamping the mounting structure to the chassis without intermediate brackets.

While I have shown and pointed out and described the fundamental novel features of the invention as applied to preferred embodiments it will be understood that various omissions and substitutions and changes in the form and details of the device illustrated and in its operation may be made by those skilled in the art without departing from the spirit of the invention. It is my intention, therefore, to be limited only as indicated by the scope of the claims which follow.

I claim:

1. A structure for mounting an electric valve on a supporting chassis in a manner in which the long dimension of said valve is parallel to the surface of said chassis, said structure comprising an L-shaped bracket, one leg of which is mechanically secured to the chassis surface and is provided with an upper surface contoured to the valve envelope, the other leg extending perpendicularly upwards from the chassis surface and having an orifice for receiving and supporting the base of said valve; and a spring retainer clamp cover, one surface of which is contoured to the shape of the valve envelope, said cover being engageable with said one leg to define a hollow cylinder therewith, formed from the upper surface of said one leg and the said one surface of said cover, which surrounds and supports said valve envelope.

2. The structure as set forth in claim 1 further including a valve socket mounted in the orifice of said other leg.

3. Electric valve mounting structure comprising a unitary heat conducting strip formed with a flat face adapted to be secured to a chassis with substantial surface contact therebetween, said strip being at least substantially as long as the main body of the valve, a contoured face on the side of said strip opposite to the flat face, said contoured face being shaped to conform substantially to the curvature of the valve and adapted to receive the valve with its axis parallel to the strip, the contoured face engaging an arcuate area of the valve of sufficient size to conduct substantial heat from the valve through the strip to the chassis, and an elongated heat conducting clamp cover removably fastened to the strip to define an elongated chamber at least substantially as long as the main body of the valve and adapted to receive the valve axially and confine it on the strip, said clamp cover surrounding and engaging an arcuate area on the side of the valve opposite to the area engaged by the contoured face on the strip, said arcuate area engaged by the clamp cover being of sufficient size to conduct substantial heat from the valve.

References Cited in the file of this patent

UNITED STATES PATENTS

| 2,462,952 | Dunkak | Mar. 1, 1949 |
| 2,478,574 | Drake | Aug. 9, 1949 |
| 2,641,635 | Scal et al. | June 9, 1953 |
| 2,662,220 | Saari | Dec. 8, 1953 |
| 2,668,933 | Shapiro | Feb. 9, 1954 |